(12) United States Patent
Robertson et al.

(10) Patent No.: US 7,793,259 B2
(45) Date of Patent: Sep. 7, 2010

(54) SYSTEM AND METHOD FOR MANAGING USER INTERACTION DATA IN A NETWORKED ENVIRONMENT

(75) Inventors: George G Robertson, Seattle, WA (US); Mary P Czerwinski, Woodinville, WA (US); Robert A DeLine, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 928 days.

(21) Appl. No.: 11/336,721

(22) Filed: Jan. 20, 2006

(65) Prior Publication Data

US 2006/0200794 A1 Sep. 7, 2006

Related U.S. Application Data

(60) Provisional application No. 60/658,328, filed on Mar. 2, 2005.

(51) Int. Cl.
G06F 9/44 (2006.01)

(52) U.S. Cl. ............... 717/120; 717/121; 717/110; 717/136; 717/137

(58) Field of Classification Search ............ 717/106, 717/108, 168, 120, 121
See application file for complete search history.

(56) References Cited

U.S. PATENT DOCUMENTS

| | | | |
|---|---|---|---|
| 6,182,056 B1 * | 1/2001 | St. Jacques et al. ......... 706/11 |
| 6,329,986 B1 * | 12/2001 | Cheng ..................... 345/419 |
| 6,698,013 B1 * | 2/2004 | Bertero et al. ............. 717/127 |
| 7,111,283 B2 * | 9/2006 | Fraser et al. ............... 717/136 |
| 7,139,916 B2 * | 11/2006 | Billingsley et al. ......... 713/182 |
| 7,263,102 B2 * | 8/2007 | Kreiner et al. ............. 370/401 |
| 7,379,464 B2 * | 5/2008 | Kreiner et al. ............. 370/401 |
| 2003/0135507 A1 * | 7/2003 | Hind et al. ................ 707/100 |
| 2004/0100974 A1 * | 5/2004 | Kreiner et al. ............. 370/401 |
| 2004/0100975 A1 * | 5/2004 | Kreiner et al. ............. 370/401 |
| 2004/0103313 A1 * | 5/2004 | Kreiner et al. ............. 713/201 |
| 2004/0127775 A1 * | 7/2004 | Miyazaki et al. ........... 600/300 |
| 2004/0230964 A1 * | 11/2004 | Waugh et al. .............. 717/168 |
| 2004/0246922 A1 * | 12/2004 | Ruan et al. ................ 370/331 |
| 2005/0015376 A1 * | 1/2005 | Fraser et al. ............... 707/10 |
| 2005/0050158 A1 * | 3/2005 | Solari ...................... 709/217 |
| 2005/0131993 A1 * | 6/2005 | Fatula, Jr. ................. 709/202 |
| 2005/0132351 A1 * | 6/2005 | Randall et al. ............. 717/168 |
| 2005/0255828 A1 * | 11/2005 | Fisher ..................... 455/406 |
| 2006/0031551 A1 * | 2/2006 | Agresta et al. ............. 709/231 |
| 2006/0036527 A1 * | 2/2006 | Tinnirello et al. .......... 705/35 |
| 2006/0080592 A1 * | 4/2006 | Alves de Moura et al. ................... 715/501.1 |
| 2006/0130046 A1 * | 6/2006 | O'Neill .................... 717/168 |
| 2006/0164978 A1 * | 7/2006 | Werner et al. .............. 370/229 |
| 2006/0242325 A1 * | 10/2006 | Ramaswamy et al. ....... 709/246 |
| 2006/0265670 A1 * | 11/2006 | Cohen et al. ............... 715/854 |
| 2007/0263645 A1 * | 11/2007 | Kreiner et al. ............. 370/401 |
| 2007/0286189 A1 * | 12/2007 | Kreiner et al. ............. 370/389 |
| 2008/0090551 A1 * | 4/2008 | Gidron et al. .............. 455/406 |

(Continued)

*Primary Examiner*—Thomas K Pham
(74) *Attorney, Agent, or Firm*—Lee & Hayes, PLLC

(57) ABSTRACT

A method and system for tracking and processing user interaction information from multiple computing devices. Individual computing devices collect user interaction information corresponding to user interaction with discrete units of a set of data, such as software programming code. The individual information is collected and processed to generate a cumulative set of user interaction information that is transmitted back to the client computing devices. The client computing devices can then provide various visual interfaces corresponding to the processed user interaction data.

20 Claims, 8 Drawing Sheets

U.S. PATENT DOCUMENTS

2008/0199155 A1* 8/2008 Hagens et al. .............. 386/124
2008/0232295 A1* 9/2008 Kreiner et al. .............. 370/313
2009/0010327 A1* 1/2009 Cheng et al. ........... 375/240.03

* cited by examiner

SYSTEM AND METHOD FOR MANAGING USER INTERACTION DATA IN A NETWORKED ENVIRONMENT

CROSS-REFERENCE TO RELATED APPLICATION

This application claims the benefit of U.S. Provisional Application No. 60/658,328, entitled System and Method For Managing User Interaction Data In A Networked Environment, and filed on Mar. 2, 2005. U.S. Provisional Application No. 60/658,328 is incorporated by reference herein.

BACKGROUND

Generally described, electronic collaborative works can involve a number of individuals who work on a common set of data. For example, with regard to software programming, a team of programmers may work concurrently, and often independent, to develop software code. In many embodiments, context information regarding individual collaborative user interaction with the common set of data can be beneficial to members of the collaborative group at large. For example, a software programmer may be required to examine a piece of unfamiliar software code generated by another programmer for modifications/additions. Accordingly, context information regarding any previous programmers' interaction with the unfamiliar software code would be beneficial to the software programmer.

With regard to software programming code, one attempt to provide additional context information relates to the utilization of programming comments embedded within the software code or set forth in separate design documents. Although potentially relevant, the quality and inconsistency of software programming commenting makes reliance on programming comments for context potentially inefficient. Another attempt to provide additional context information for software programming code relates to the capture of individual user interaction with discrete units of code, generally referred to as computational wear. The individual user interaction can be shared with other users to provide individual user contexts to the code. Nevertheless, current computational wear approaches are not well-suited for group interaction because these approaches do not provide multiple user interaction contexts.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A method and system for tracking and processing user interaction information from multiple computing devices is provided. Individual computing devices collect user interaction information corresponding to user interaction with discrete units of a set of data, such as software programming code. The individual information is collected and processed to generate a cumulative set of user interaction information that is transmitted back to the client computing devices. The client computing devices can then provide various visual interfaces corresponding to the processed user interaction data.

In accordance with an aspect of the present invention, a method for managing user interaction data is provided. The method may be implemented in a communication network including at least two user computing devices and an information collection computing device. The user computing devices communicate with the information collection computing device via the communication network.

In accordance with the method, a user computing device obtains user interaction data corresponding to user interaction with discrete units of a set of data. The set of data can correspond to software programming code having discrete units. The user computing device then transmits the user interaction data to an information collection computing device over the communication network. The transmission can be done in real time or periodically. The user computing device then obtains processed user interaction data from the information collection computing device. The processed user interaction data includes processed user interaction data corresponding to user interaction with discrete units of the set of data from a second user computing device. The user computing device can generate various user interfaces based on the processed user interaction data.

In accordance with another aspect of the present invention, a method for managing user interaction data is provided. The method may be implemented in a communication network including at least two user computing devices and an information collection computing device. The user computing devices communicate with the information collection computing device via the communication network.

In accordance with the method, an information collection computing device obtains user interaction data from a first user computing device corresponding to user interaction with discrete units of a set of data, such as software programming code. The information collection computing device also obtains user interaction data from a second user computing device corresponding to user interaction with discrete units of the set of data. The information collection computing device processes the user interaction data from the first and second user computing devices. For example, the information collection computing device can generate an associative matrix of user interaction information. The information collection computing device transmits the processed user interaction data to at least the first or second user computing devices.

In accordance with a further aspect of the present invention, a system for managing user interaction data is provided. The system includes a first user computing device and a second user computing device for collecting user interaction data with discrete units of a set of data. The system also includes an information collection computing device for processing user interaction data from the first and second user computing devices. The information collection computing device transmits the processing user interaction data to the first or second user computing devices.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, the present invention relates to a system and method for tracking user interaction of a set of data. More specifically, the present invention relates to various methods for obtaining cumulative software programming code user interaction and generating various user interfaces incorporating the interaction data. Although the present invention will be described with regard to illustrative software programming code data structures, system architectures and user interfaces, one skilled in the relevant art will appreciate that the disclosed embodiments are illustrative in nature and should not be construed as limited.

Figure 1:
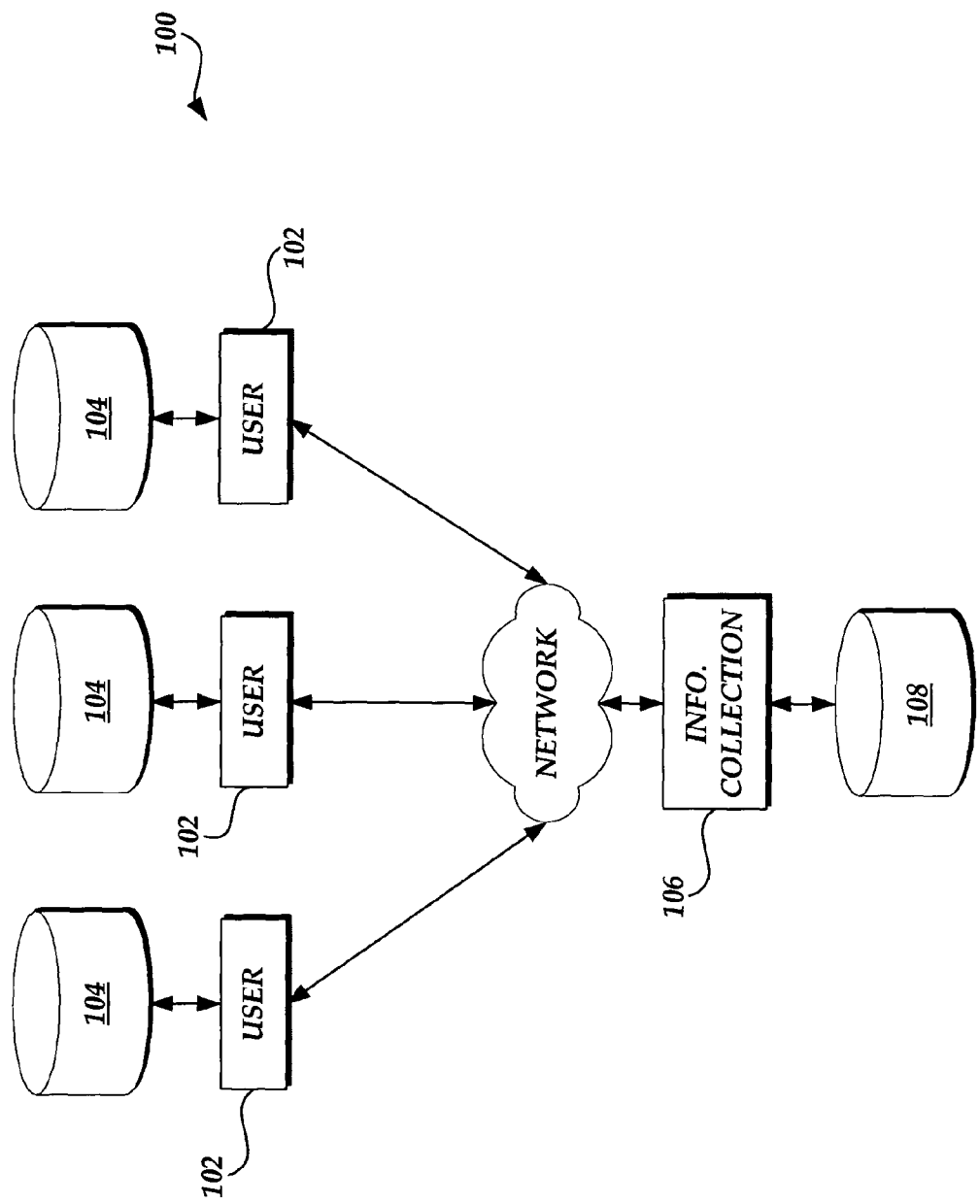
FIG. 1 is a block diagram of a software programming code user interaction management system formed in accordance with the present invention.

FIG. 1 is a block diagram of a software programming code user interaction management system 100 formed in accordance with the present invention. The software programming code user interaction management system 100 includes a plurality of user computing devices 102 in communication with a network, such as the Internet or a local area network. In an illustrative embodiment of the present invention, each user computing device 102 includes one or more software applications for displaying and/or editing software programming code. Each user computing device 102 can also include a software application or software component for gathering user interaction data associated with software programming code. The user interaction data can be stored in a client data store 104, which may be local or remote from the user computing device 102.

The software programming code user interaction management system 100 can also include an information collection computing device 106, such as a processing server, in communication with the plurality of user computing devices 102 via the communication network. The information collection computing device 106 can include one or more computing devices configured to carry out the various functions of the processing server. The computing devices associated with the information collection computing device 106 may correspond to a centralized location or alternatively, be configured in a distributed manner. The information collection computing device 106 communicates with a cumulative user interaction data store 108. The user interaction data store 108 can correspond to one or more data repositories for maintaining information relevant to user interaction data.

One skilled in the relevant art will appreciate that the various computing devices described with regard to the software programming code user interaction management system 100 can include personal computers, server computers, hand-held computers, mobile computers, mobile telephones, personal digital assistants, and the like. Likewise, although the software programming code user interaction management system 100 is illustrated as in a client/server configuration, one skilled in the relevant art will appreciate that the software programming code user interaction management system 100 may also be implemented in a peer-to-peer configuration.

Figure 2:
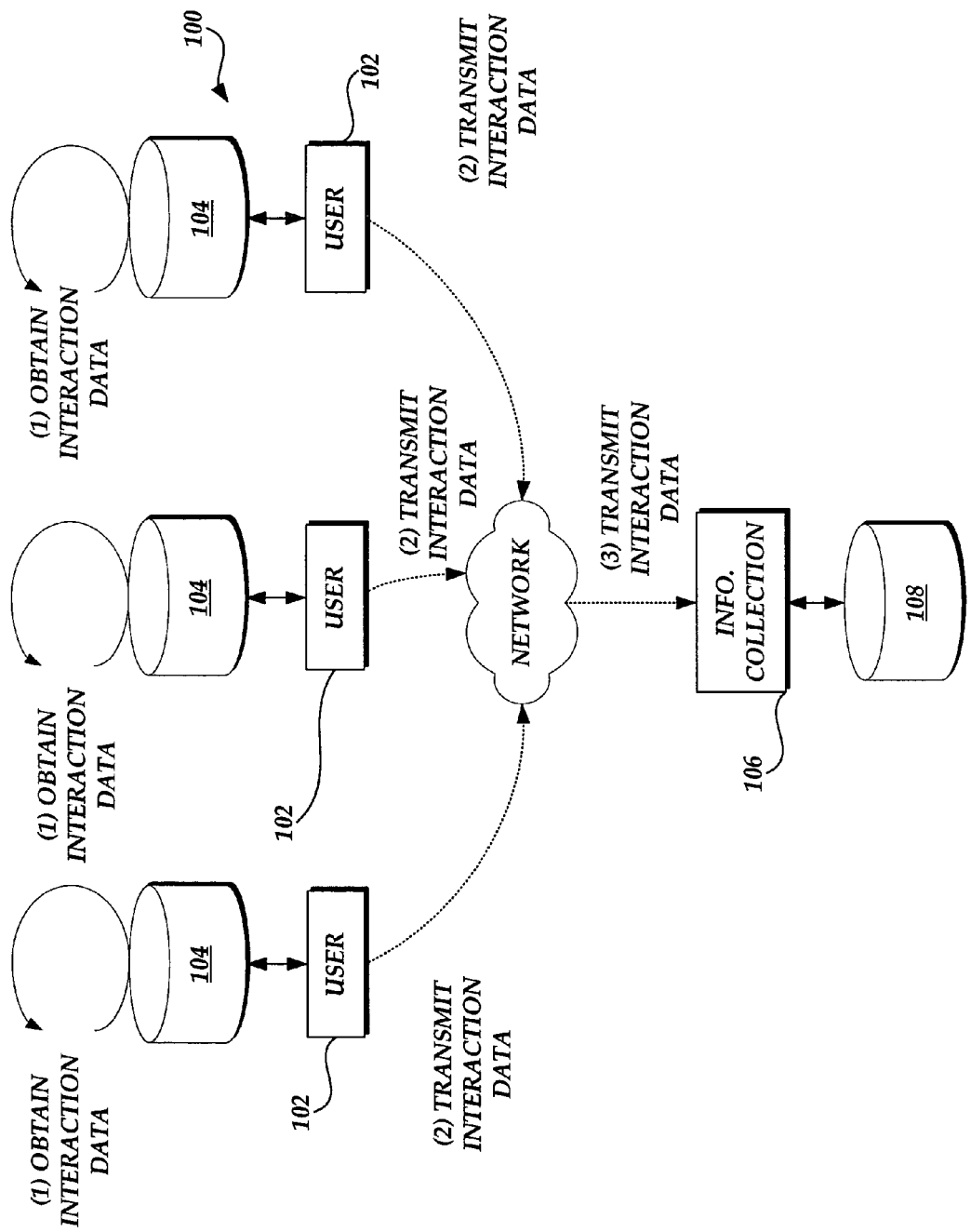
FIG. 2 is a block diagram of the software programming code user interaction management system of FIG. 1 illustrating the collection and transmission of user interaction data from user computing devices to an information collection computer device in accordance with the present invention.
Figure 3:
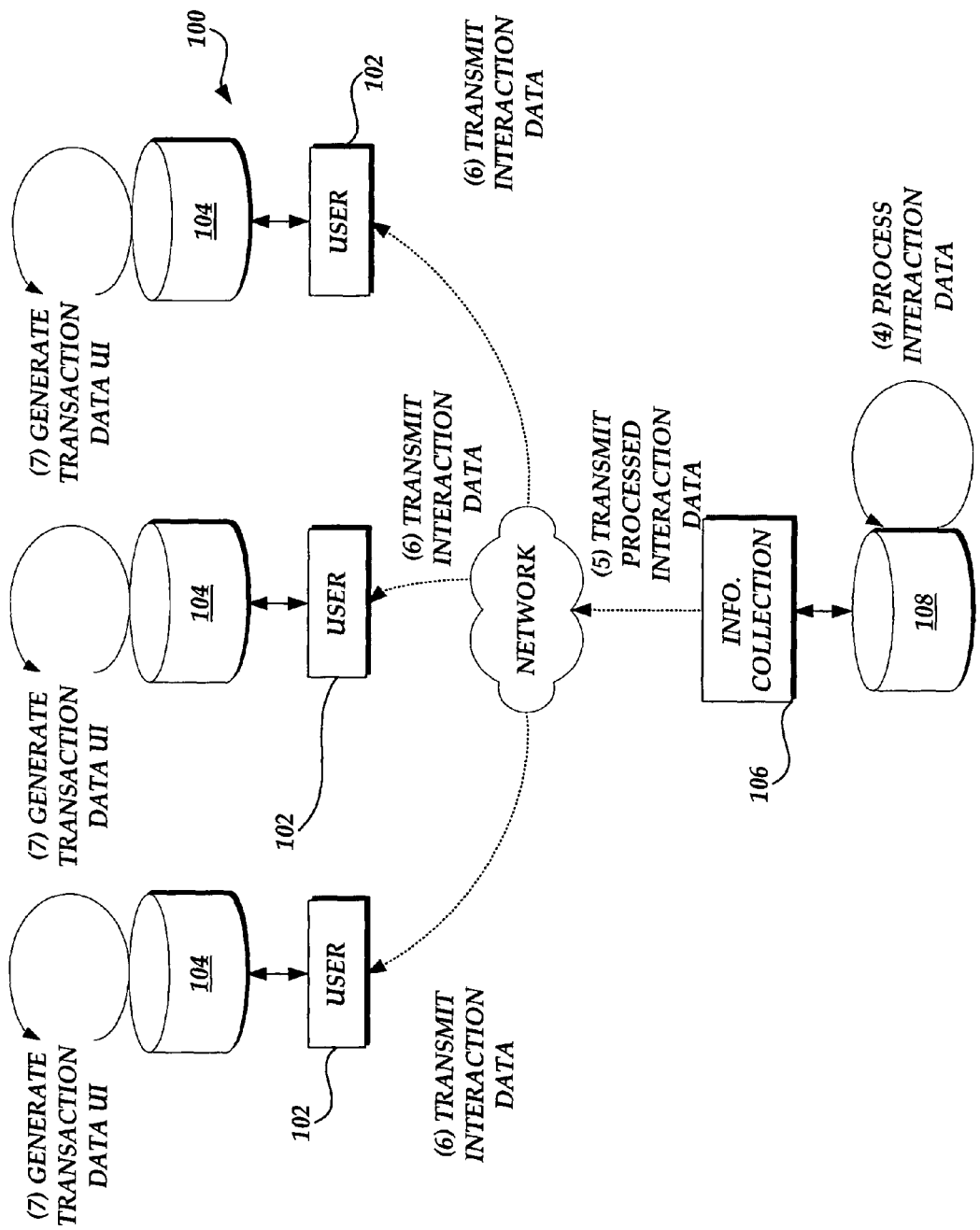
FIG. 3 is a block diagram of the software programming code user interaction management system of FIG. 1 illustrating the generation and transmission of a cumulative set of user interaction data from an information collection computing device to a plurality of user computing devices in accordance with the present invention.

With reference now to FIGS. 2 and 3, in accordance with an aspect of the present invention, the information collection computing device 106 and the user computing devices 102 communicate as part of a two-way dynamic interaction of software programming code user interaction data. With reference to FIG. 2, each user computing device 102 obtains software programming code interaction data from one or more users using one or more software application associated with the user computing device. In an illustrative embodiment of the present invention, the software programming code interaction data can include data identifying which software programming code discrete units are being viewed/accessed by a user, time spent accessing various software programming code discrete units, the order in which software programming code discrete units are accessed, specific software programming code projects associated with the user interaction, software programming code check ins, data transmissions involving software programming code and the like. Additionally, the software programming code interaction data can also include data from additional or alternative software applications relating to the software programming code, such as user access to documentation or communications related to the software programming code, user access to debuggers applications or complier applications, and the like. Each user computing device 102 may utilize a variety of tools to collect the user interaction data. Each user computing device 102 can store the user interaction data at the client data store 104. In an illustrative embodiment of the present invention, the user computing devices 102 may filter some of the collected interaction data based on statistically incompatible data (e.g., a user viewing a piece of code for 8 consecutive hours from 10:00 PM to 6:00 am).

Each user computing device 102 transmits the user interaction data, periodically or in real time, to the information collection computing device 106. With reference to FIG. 3, the information collection computing device 106 obtains the user interaction data from each of the user computing devices 102 and processes the user interaction data to generate a cumulative set of interaction data. In an illustrative embodiment of the present invention, the information collection computing device 106 can generate a list of the most frequently accessed software programming code discrete units. Additionally, the processing server can generate an associative matrix of user navigation between software programming code discrete units. The information collection computing device 106 may also generate additional data based on different types of user interaction data collected from the user computing devices 102. The information collection computing device 106 can filter the user interaction data according to the intended use by the user computing device 102.

Upon request, or periodically, the information collection computing device 106 transmits a cumulative set of software programming code interaction data to at least a subset of the user computing devices 102. The user computing devices 102 store the cumulative set of interaction data. Additionally, the user computing devices 102 can generate one of a plurality of user interfaces incorporating the cumulative set of interaction data.

Figure 4:
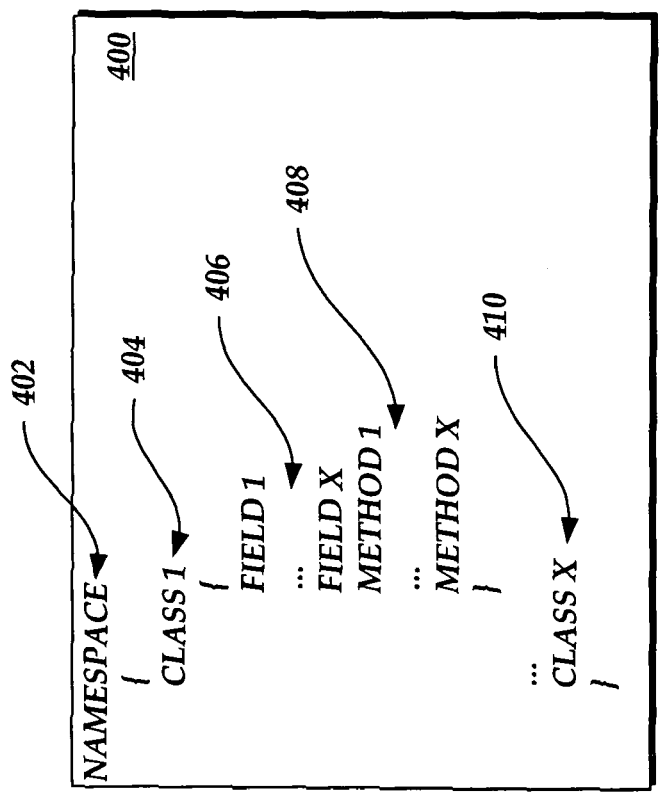
FIG. 4 is a block diagram illustrative of software programming code data structure having discrete units made up of field and method data in accordance with the present invention.

With reference now to FIG. 4, an illustrative software programming code data structure 400 compatible with the present invention will be described. In accordance with the present invention, the software programming code data structure includes one or more discrete units. As illustrated in FIG. 4, the data structure 400 includes a namespace 402 which defines one or more classes 404, 410. In turn each class 404, 410 can define one or more fields 406 and methods 408. In an illustrative embodiment, the user interaction data with the actual software programming code may be tracked according to any aspect of a structured programming environment, such as namespace, class, field or method. Alternatively, user interaction data may be tracked according to a subset of the software programming code, such as fields and methods. In this embodiment, the user interaction data for the other portions of the software programming code, such as for classes and namespaces, can be calculated from the interaction data from subset of the software programming code.

Figure 5A:
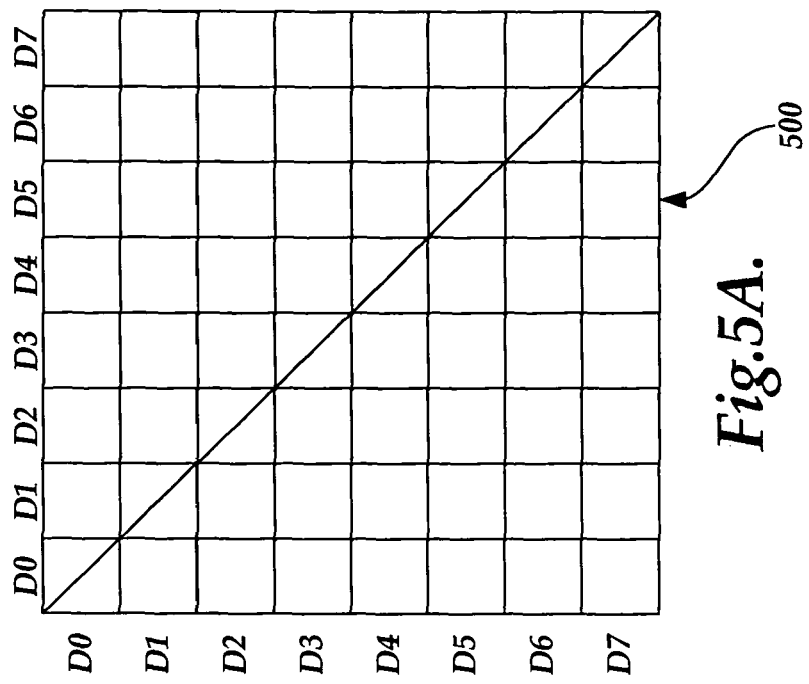
FIGS. 5A-5C are block diagrams illustrative an associative matrix for software programming code discrete units in accordance with the present invention.
Figure 5C:
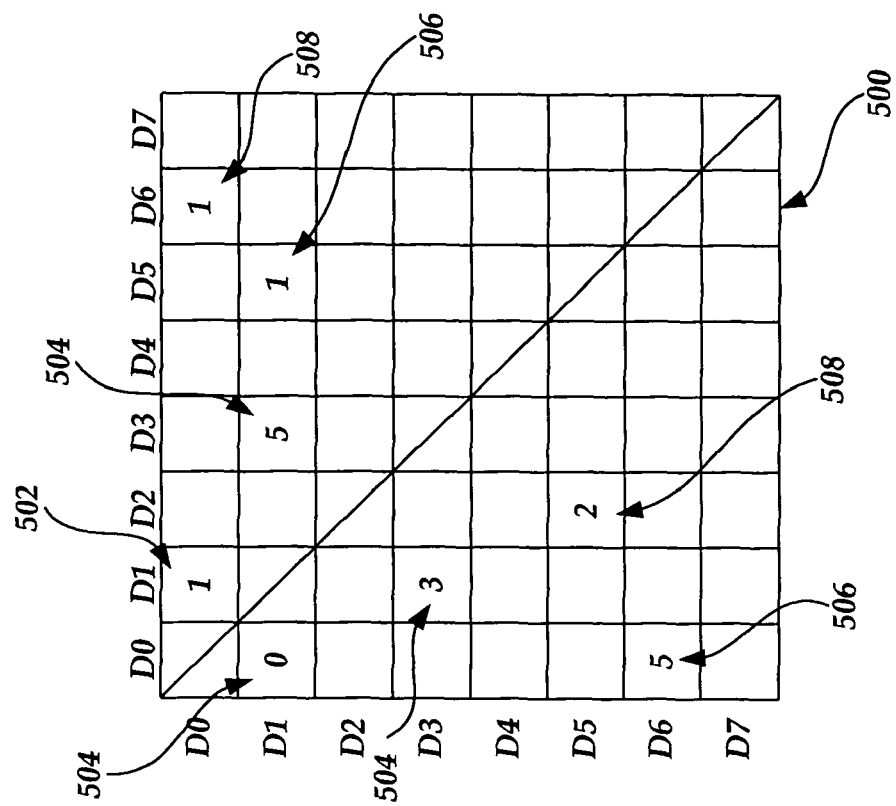
Figure 5B:
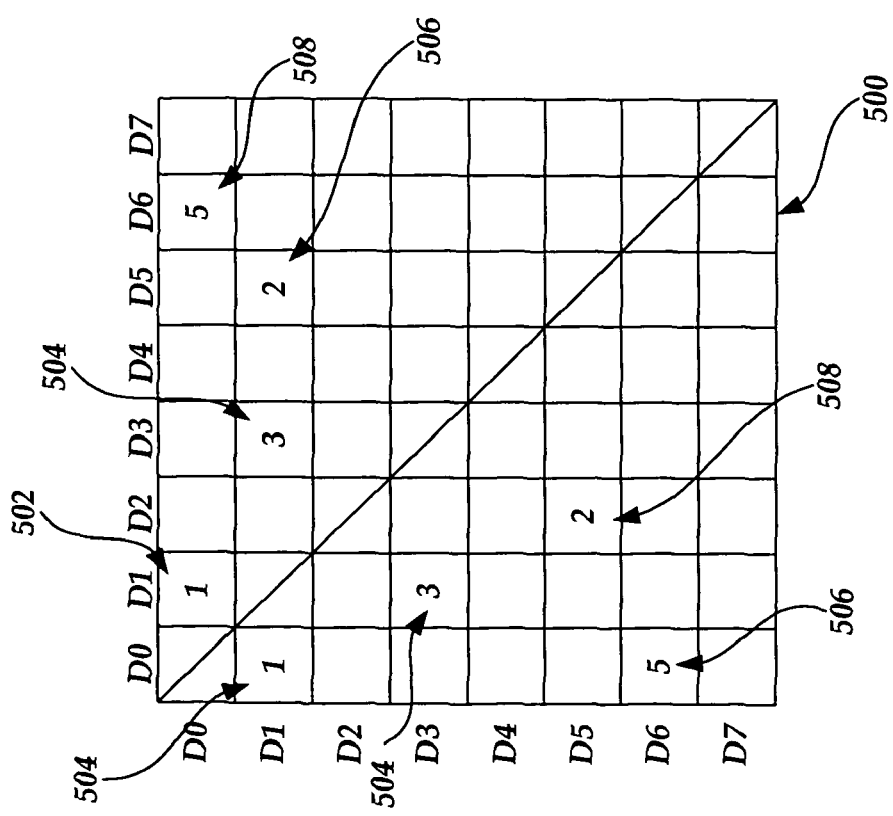

With reference to FIGS. 5A-5C, in accordance with an aspect of the present invention, the information collection computing device 106 or a user computing device 102 can generate an associative matrix 500 for tracking user navigation between software programming code discrete units. The associative matrix 500 can include a cell for each discrete unit combination. As illustrated in FIG. 5B, the matrix 500 tracks each direct navigation from a first discrete unit to a second unit. In an illustrative embodiment of the present invention, the matrix 500 is symmetric such that navigation order is not taken into account. Additionally, each navigation may be considered an update of "1" unit in the matrix cell. Alternatively, the information collection computing device 106 may associate weights to each type of navigation and increment the cell value accordingly. For example, an individual user's activity will result in a higher incremental value than other users. Additionally, at least a portion of the source history interaction data may be used to prepopulate the matrix. With reference to FIG. 5C, the matrix 500 may also be an asymmetrical matrix in which navigation order is taken into account. In a still further embodiment of the present invention, the information collection computing device 106 may maintain multiple associative matrices to facilitate multiple-stop analysis and/or customized analysis.

Figure 6:
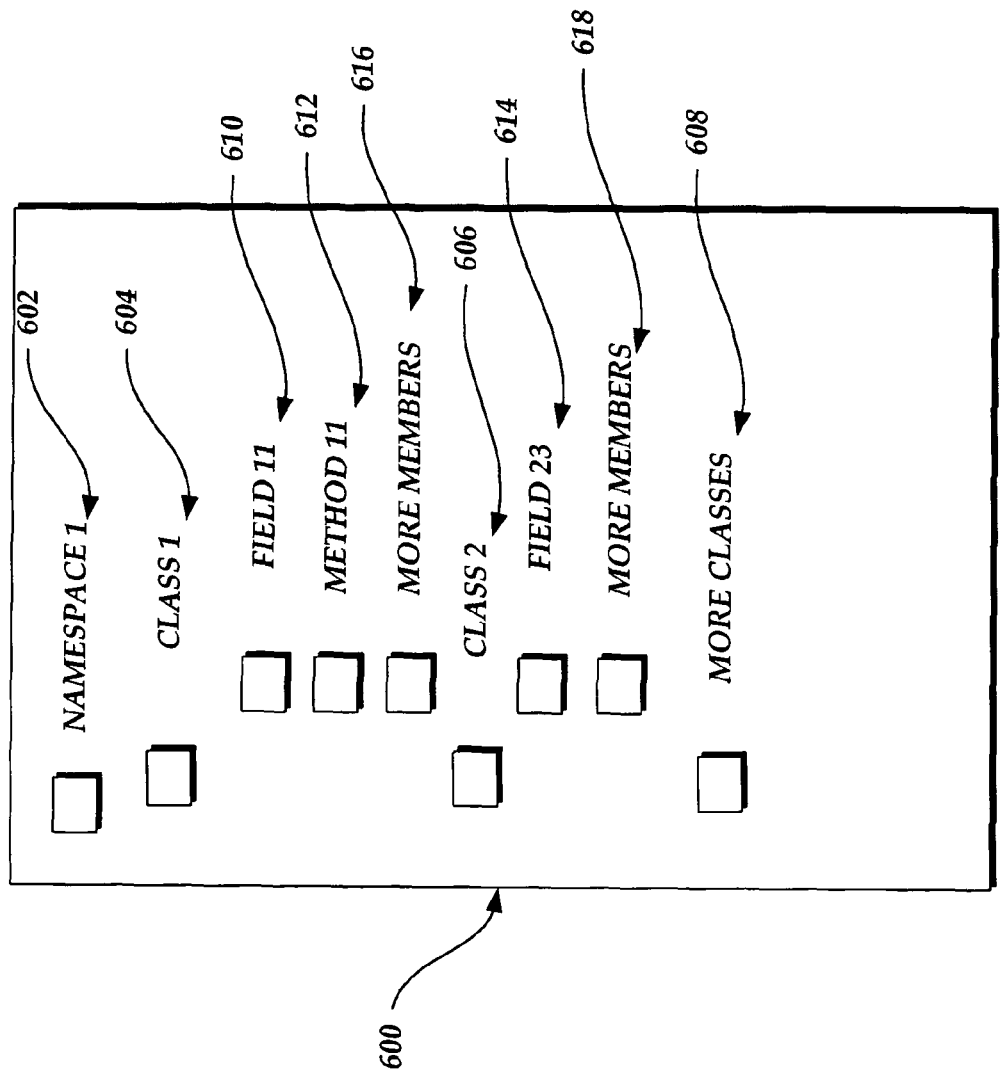
FIG. 6 is a block diagram of a screen display illustrative of a tree view of software programming code highlighting software programming code discrete units based on user interaction.

In an illustrative embodiment of the present invention, the user computing devices 102 can generate various user interfaces to displays aspects of the cumulative set of interaction data. FIG. 6 is a block diagram of a screen display illustrative of a tree view 600 of software programming code highlighting software programming code discrete units based on user interaction. The tree view 600 mirrors the data structure 400 (FIG. 4) for a selected namespace. More specifically, the tree view 600 includes a selected namespace element 602, which defines a subset of class elements 604, 606.

In an illustrative embodiment, the tree view 600 displays a limited number of classes based upon available display space on the user computing device and the processed user interaction history. For example, the processed user interaction history from the information collection computing device 106 may apply a filter to display the classes that were most accessed by the users. Alternatively, the information collection computing device may apply a filter to display classes that were accessed by a threshold number of users or classes that were accessed a threshold number of times. The tree view 600 can also include an additional class control 608 that causes the tree view 600 to be expanded to show additional classes with the namespace 602. In a similar manner, the tree view 600 also displays a limited number of methods and fields 610, 612, 614 for each respective displayed class 604, 606 based upon the available display space and the processed user interaction data. Below each displayed class 604, 606 the tree view 600 includes an expansion control 616, 618 for showing additional fields or methods under class. In an illustrative embodiment, the tree view 600 can be further manipulated after the initial display.

Figure 7:
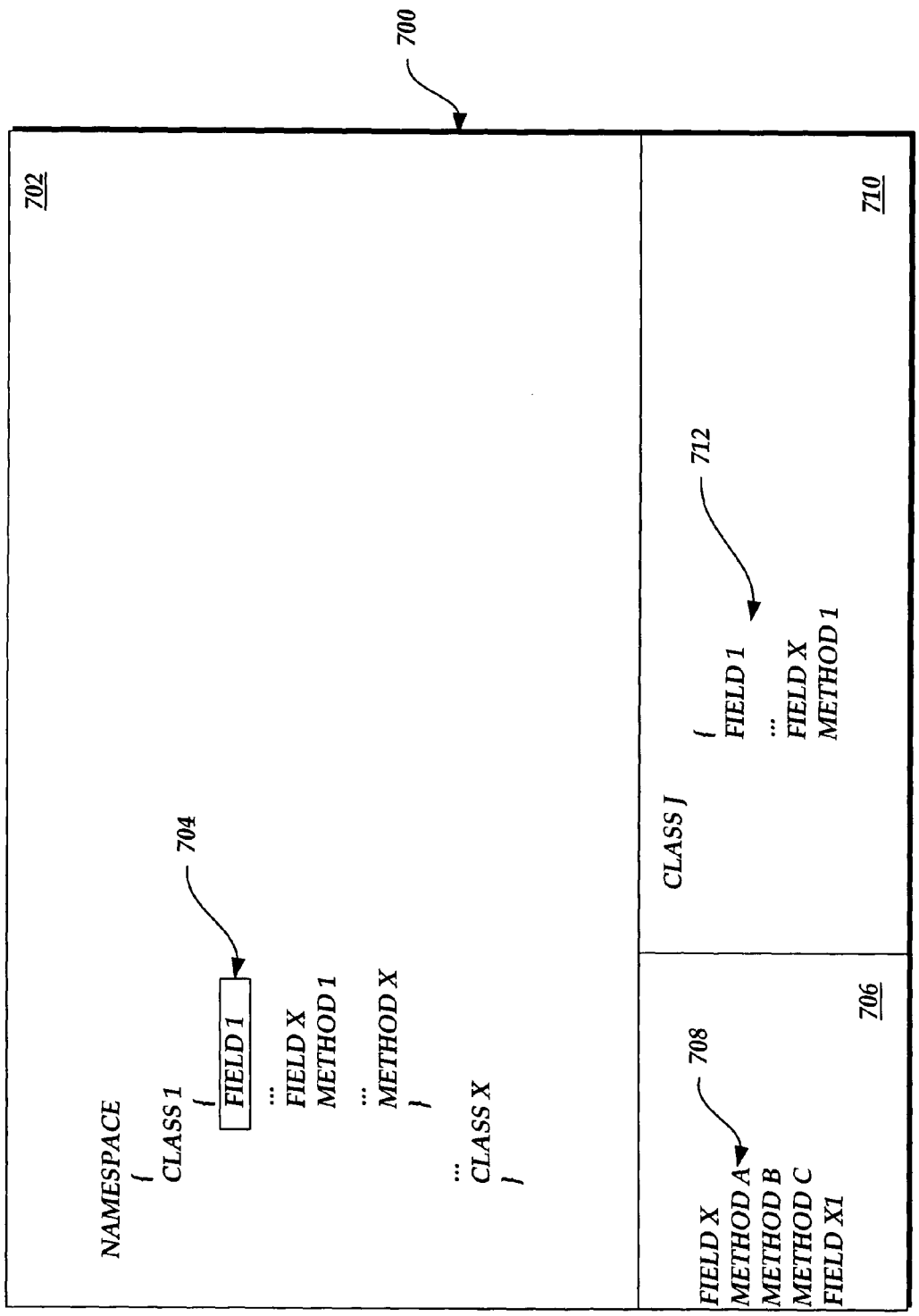
FIG. 7 is a block diagram of a screen display illustrative of a discrete software programming code unit interaction data user interface in accordance with the present invention.

With reference now to FIG. 7, a block diagram of an alternate screen display illustrative of a discrete software programming code unit interaction data user interface 700 will be described. The user interface 700 includes a main display portion 702 for display software code mirroring data structure 400 (FIG. 4). In an illustrative embodiment, at least a portion of software code can be displayed in its entirety. Alternatively, a filtered version of the software code, such as described above with regard to FIG. 6, may also be displayed in the main portion.

Within the main display portion 702 various units of the displayed portion of the software code can be selected by a user. For example, the user can select code units by using input controls such as a keyboard or a mouse. Additionally, code units may also be selected utilizing searching, or other filtering functionality. As illustrated in FIG. 7, code unit 704 has been selected. Based on the selected code unit, a second portion 706 of the user interface 700 identifies a subset of other units (e.g., other classes or methods) that were most frequently accessed in conjunction with the selected unit. For example, the subset of other units may be an ordered list based on the associative matrix (FIGS. 5A-5C). The subset of other units can include an identification of the number of times the additional units of code were accessed directly after or before the selected code unit.

In an illustrative embodiment, the subset of additional units in the second portion 706 can correspond to selectable graphical objects on the user interface 700. As described above, a user can select an object using a keyboard, mouse and/or filtering functionality. As illustrated in FIG. 7, code unit 708 has been selected. Based on the selection, a third portion 710 of the user interface 700 can display additional context about the selected unit 708. For example, the third portion 710 can include a preview 712 of the software code associated with the selected code unit 708. Thus, users can select the most related/accessed code units in the second portion 706 and obtain additional information regarding the selected code units in the third portion 710.

Figure 8:
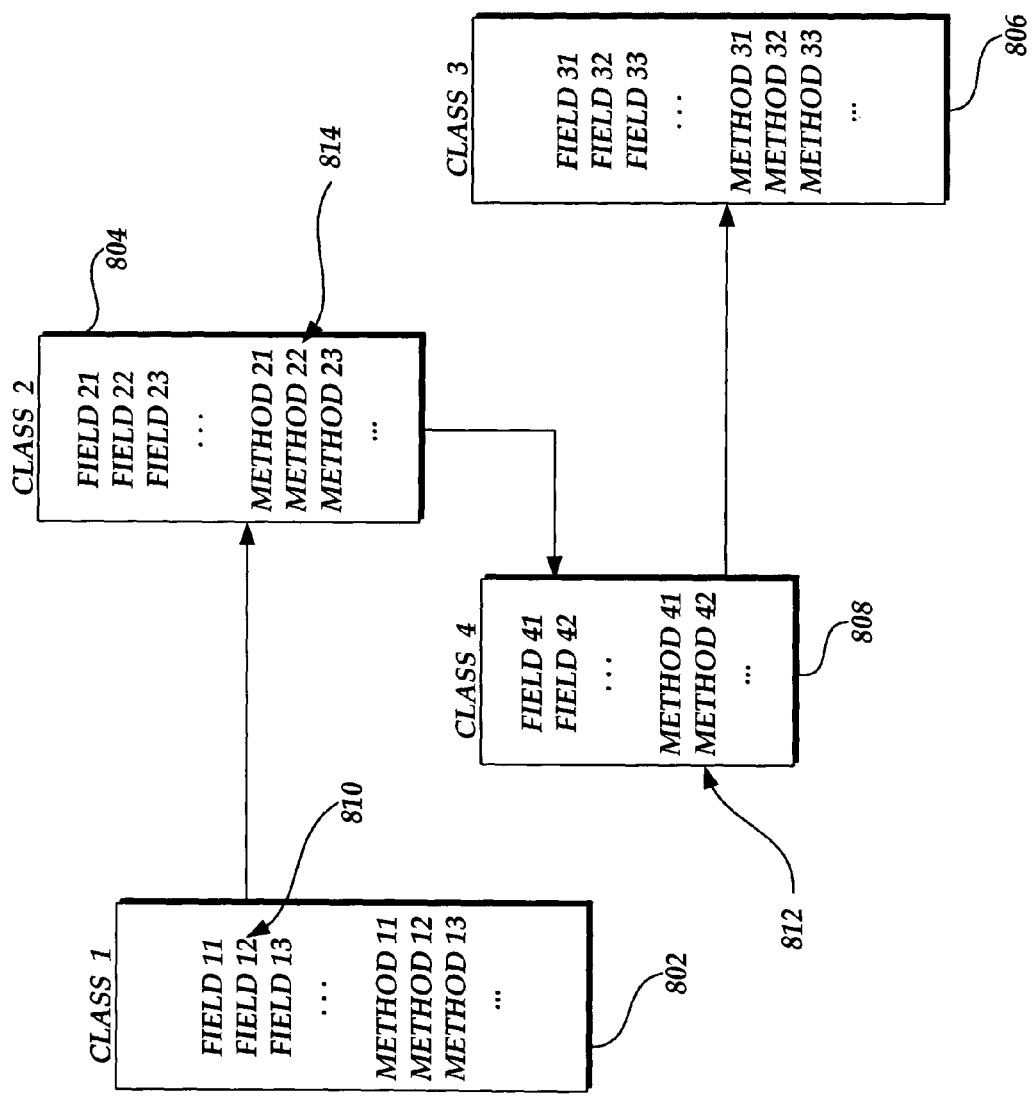
FIG. 8 is a block diagram of a screen display illustrative of a software programming code UML diagram including discrete software programming code unit interaction data in accordance with the present invention.

With reference now to FIG. 8, a block diagram of a screen display illustrative of a software programming code UML diagram 800 including discrete software programming code unit interaction data will be described. As illustrated in FIG. 8, the UML diagram 800 includes a display of at least a subset of classes 802, 804, 806, 808 associated with a selected namespace. For example, the UML diagram 800 can display a portion of a selected namespace. Alternatively, the UML diagram 800 can provide filtered view of the most frequently accessed classes or the classes that have been viewed a threshold amount of times based on the processed user interaction data. In a similar manner to FIG. 6, the UML diagram 800 can provide a filtered view of the methods and fields 810, 812, 814, 816 of each displayed class.

Based on a selected number of units (e.g., methods or fields) with a classes, the UML diagram 800 can provide a visual record of user interaction from the selected unit to other units. For example, the UML diagram 800 can provide a visual record of the units most closely related to a selected unit. In one embodiment, the UML diagram 800 can include visual cues, such as color highlighting, font changes or transparency applications to highlight selected classes. In an alternate embodiment, the UML diagram 800 can include arrows or other points to identify the units most closely associated with a selected unit or set of units.

While illustrative embodiments of the invention have been illustrated and described, it will be appreciated that various changes can be made therein without departing from the spirit and scope of the invention.

The embodiments of the invention in which an exclusive property or privilege is claimed are defined as follows:

1. In a communication network including at least two user computing devices and an information collection computing device, wherein the user computing devices communicate with the information collection computing device via the communication network, a method for managing user programming interaction data comprising:
   obtaining, at a first user computing device, user programming interaction data corresponding to user programming interaction with discrete units of a set of data including sets of data associated with software programming code, wherein user programming interaction data comprises data identifying:
      which discrete units are being viewed by a user;
      time spent accessing discrete units;
      an order in which discrete units are accessed;
      specific software programming code projects associated with a user interaction;
      software programming code check-ins;
      data transmissions involving discrete units; and
      data from additional software applications relating to discrete units;
   transmitting the user programming interaction data including the data associated with software programming code to an information collection computing device; and
   obtaining processed user programming interaction data from the information collection computing device, wherein the processed user programming interaction data includes processed user programming interaction data corresponding to user programming interaction with discrete units of the set of data including processed user interaction data indicating an order in which a first and a second set of data was accessed at a second user computing device from the second user computing device.

2. The method as recited in claim 1 further comprising, generating a user interface at the first user computing device for displaying the processed user programming interaction data.

3. The method as recited in claim 2, wherein the user interface corresponds to a display of a selected discrete unit of the set of data and at least one additional discrete unit of the set of data associated with the selected discrete unit of the set of data based upon the processed user programming interaction data.

4. The method as recited in claim 2, wherein the user interface corresponds to a block diagram illustrating a number of discrete units of the set of data and additional discrete units of the set of data most closely associated with the number of discrete units based upon the processed user programming interaction data.

5. The method as recited in claim 1, wherein the set of data corresponds to software programming code and wherein the discrete units corresponds to fields and methods of the programming code.

6. The method as recited in claim 1, wherein transmitting the user programming interaction data to the information collection computing device includes transmitting user programming interaction data in real time.

7. The method as recited in claim 1, wherein transmitting the user programming interaction data to the information collection computing device includes collecting user programming interaction data and transmitting user programming interaction data to the information collection computing device upon satisfaction of transmission criteria.

8. The method as recited in claim 1 further comprising, processing the user programming interaction prior to transmitting the user programming interaction data to the information collection computing device.

9. The method as recited in claim 8, wherein processing the user programming interaction prior to transmitting the user programming interaction data to the information collection computing device includes generating a matrix of user programming interaction between the discrete units of the set of data.

10. The method as recited in claim 1 further comprising, integrating the processed user programming interaction data with locally stored user programming interaction data corresponding to user programming interaction data with discrete units of the set of data.

11. The method as recited in claim 1 further comprising, filtering the user programming interaction data based on statistically incompatible data.

12. The method as recited in claim 1, wherein a discrete unit of a set of data includes at least a namespace, a class, a field and a method.

13. In a communication network including at least two user computing devices and an information collection computing device, wherein the user computing devices communicate with the information collection computing device via the communication network, a method for managing user programming interaction data comprising:
   obtaining user programming interaction data from a first user computing device corresponding to user programming interaction with discrete units of a set of data, wherein user programming interaction data comprises data from additional software applications relating to discrete units;
   obtaining user programming interaction data from a second user computing device corresponding to user programming interaction with discrete units of the set of data;
   processing the user programming interaction data from the first and second user computing devices, wherein processing the user programming interaction from the first and second user computing devices includes:
      associating a first weight to user programming interaction from the first computing device; and
      associating a second weight to user programming interaction from the second user computing device; and
      processing the user programming interaction from the first and second user computing devices according to the first and second weights; and
   transmitting the processed user programming interaction data to at least the first or second user computing devices.

14. The method as recited in claim 13, wherein processing the user programming interaction data from the first and second user computing devices includes generating a matrix tracking user programming interaction between a first and second discrete unit of the set of data.

15. The method as recited in claim 14, wherein the matrix for tracking user programming interaction between the first and second discrete units of the set of data corresponds to tracking programming interaction in a single direction.

16. The method as recited in claim 14, wherein the matrix for tracking user programming interaction between the first and second discrete units of the set of data corresponds to tracking bi-directional programming interaction.

17. A system for managing user programming interaction data comprising:
   a first user computing device for collecting user programming interaction data with discrete units of a set of data;
   a second user computing device for collecting user programming interaction data with discrete units of a set of data; and
   an information collection computing device for processing user programming interaction data from the first and second user computing devices, wherein the information collection computing device transmits the processing user programming interaction data to the first or second user computing devices, wherein the information collection computing devices generates a matrix of user programming interaction between a first and second discrete unit of the set of data, wherein generating the matrix comprises:
   associating a first weight to user programming interaction from the first user computing devices;
   associating a second weight to user programming interaction from the second user computing device; and
   processing the user programming interaction data from the first and second user computing devices according to the first and second weights.

18. The system as recited in claim 17, wherein the first or second computing device generates a user interface corresponding to the processed user programming interaction data from the information collection computing device.

19. The system as recited in claim 17, wherein the set of data corresponds to software programming code having a plurality of discrete units.

20. The system as recited in claim 17, wherein the first and second user computing devices process the user programming interaction data prior to transmitting the user programming interaction data to the information collection computing device.

* * * * *